United States Patent
Ha et al.

(10) Patent No.: US 9,026,795 B2
(45) Date of Patent: May 5, 2015

(54) APPARATUS AND METHOD FOR SIGNING APPLICATION

(75) Inventors: Ji-Hoon Ha, Goyang-si (KR); Min Kim, Seoul (KR); Seog-Cheon Jeon, Seoul (KR)

(73) Assignee: KT Corporation, Seongnam (KR)

( * ) Notice: Subject to any disclaimer, the term of this patent is extended or adjusted under 35 U.S.C. 154(b) by 222 days.

(21) Appl. No.: 13/486,536

(22) Filed: Jun. 1, 2012

(65) Prior Publication Data

US 2013/0159719 A1    Jun. 20, 2013

(30) Foreign Application Priority Data

Dec. 19, 2011   (KR) .................. 10-2011-0137673

(51) Int. Cl.
*H04L 9/32*   (2006.01)
*G06F 21/51*  (2013.01)
*G06F 11/30*  (2006.01)
*G06F 12/14*  (2006.01)

(52) U.S. Cl.
CPC ....................................... *G06F 21/51* (2013.01)

(58) Field of Classification Search
None
See application file for complete search history.

(56) References Cited

U.S. PATENT DOCUMENTS

| | | | | |
|---|---|---|---|---|
| 8,621,226 | B1 * | 12/2013 | Hackborn et al. | 713/176 |
| 2004/0025022 | A1 * | 2/2004 | Yach et al. | 713/176 |
| 2005/0021971 | A1 * | 1/2005 | Patankar et al. | 713/176 |
| 2010/0332848 | A1 * | 12/2010 | Adams et al. | 713/189 |
| 2013/0078949 | A1 * | 3/2013 | Pecen et al. | 455/411 |

FOREIGN PATENT DOCUMENTS

| | | |
|---|---|---|
| JP | 3808836 B2 | 8/2006 |
| KR | 20020005300 A | 1/2002 |
| KR | 20080072452 A | 8/2008 |
| KR | 20080075304 A | 8/2008 |

* cited by examiner

*Primary Examiner* — Shin-Hon Chen
(74) *Attorney, Agent, or Firm* — Sughrue Mion, PLLC

(57) ABSTRACT

When a signature apparatus cooperating with a market server receives signature request information for an optional application from the market server to sign an application, the signature apparatus determines whether an authentication note has been issued corresponding to application identification information included in the signature request information based on the application identification information. When the authentication note has not been issued; the signature apparatus issues the authentication note using the application identification information, generates signature information for the to application using the application identification information, and signs the application including the authentication note and the signature information.

7 Claims, 5 Drawing Sheets

295
APPARATUS AND METHOD FOR SIGNING APPLICATION

CROSS-REFERENCE TO RELATED APPLICATION

This application claims priority to and the benefit of Korean Patent Application No. 10-2011-0137673 filed in the Korean Intellectual Property Office on Dec. 19, 2011, the entire contents of which are incorporated herein by reference.

BACKGROUND OF THE INVENTION (a) Field of the Invention

The present invention relates to an apparatus and a method for signing an application.

(b) Description of the Related Art

With the development of various smart phones, various applications capable of being executed through a smart phone and of providing various services have been developed and circulated. An application market circulating applications provides applications registered by a number of application developers to users.

The application market has a problem in that the application market cannot manage applications even though the provided applications are modulated or unauthenticated applications circulate between users. Further, so as to control a terminal and an application program interface (API) use authority of a communication business necessary for executing applications, an execution authority needs to be provided to a terminal. Due to this, the application market has a problem in that it cannot control an execution authority with respect to applications.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a signature apparatus and a signature method of applications having advantages of preventing the applications from being modulated, of confirming an application source, of controlling an API use authority.

To achieve a technical object of the present invention, a method for signing an application by a signature apparatus cooperating with a market server according to an aspect of the present invention, includes:

receiving signature request information for an optional application from the market server; determining whether an authentication note has been issued corresponding to application identification information included in the signature request information based on the application identification information; issuing the authentication note using the application identification information when the authentication note has not been issued; generating signature information for the application using the application identification information; and signing the application including the authentication note and the signature information.

The signature request information may include at least one of an application code, an application identifier, application program interface (API) use authority level information requested for executing the application, and identification information of the market server.

The issuing of the authentication note may include: generating a first key and a second key using the application identification information; generating and issuing an authentication note for the application using the first key.

The generating and issuing of the authentication note may include generating and issuing different authentication notes according to the API use authority level information.

The generating of the signature information may include encrypting a hash value being a result obtained by hashing the application code using a hash function using the second key generated using the application identification information.

The method may further include after the determining whether the authentication node has been issued, signing the application using the issued authentication note and signature information when the authentication note has been issued.

The method may further include after the signing of the application, receiving the application with the authentication note and the signature information from the market server cooperating with the market server; extracting the authentication note and the signature information by the terminal; decoding the signature information by the terminal using the authentication note, and comparing the decoded signature information with a hash value being a result obtained by hashing the application code through a hash function by the terminal; and installing the application by the terminal when the decoded signature information is identical with the hash value.

To achieve a technical object of the present invention, an apparatus for signing an application cooperating with a market server and providing the signed application to a terminal cooperating with the market sever according to another aspect of the present invention, includes:

an authentication generating unit determining whether an authentication note is issued based on an application identifier of an optional application received from the market server in response to a request of signature for the optional application, and generating the authentication note with a first key, wherein the first key and a second key is generated using the application identifier; an authentication note storage unit storing the authentication note generated by the authentication note, the second key generated using the application identifier, and the application identifier; and an application signature unit encrypting a hash value generated by hashing an application code of the application using a hash function with the second key generated by the authentication note generating unit to generate signature information, and inserting the generated authentication note and the signature information into the application code to sign the application.

The apparatus may further include an information receiving unit receiving the signature request information includes at least one of an application code, an application identifier, application program interface (API) use authority level information, and identification information of the market server from the market server.

The terminal may include: an application receiving unit receiving the application with the application code in which the signature information and the authentication note are inserted; an application installing unit extracting the signature information and the authentication note from the application received by the application receiving unit, decoding the signature information using the extracted authentication code, and installing the received application when the decoded signature information is identical with the hash value generated by hashing the application code of the application using the hash function.

The present invention may prevent modulation of various applications provided through a market server, thereby preventing circulation of illegally modulated applications.

Further, the reliability of applications is reconsidered through confirmation of a source of the application and a defense function against viruses is also provided to prevent the occurrence of various problems due to indiscrete execution of the applications.

In addition, application distributing businessmen may secure a control authority with respect to application circulation to easily manage applications.

DETAILED DESCRIPTION OF THE EMBODIMENTS

Figure 1:
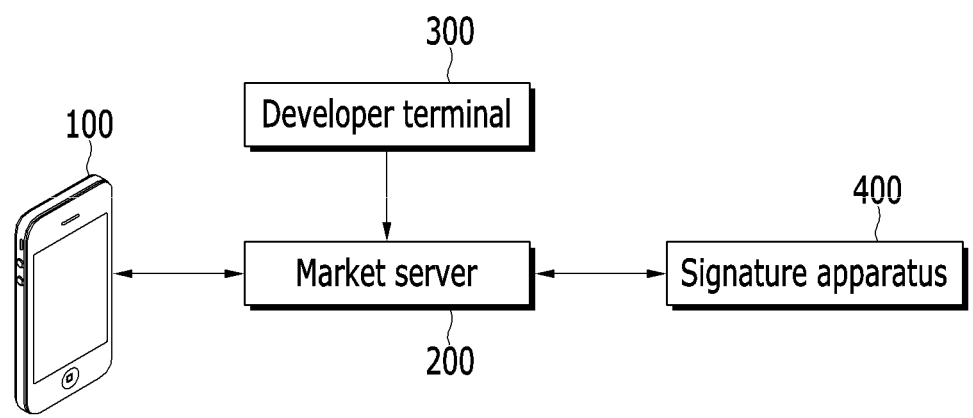
FIG. 1 is an exemplary diagram illustrating an environment providing an application signature according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a terminal may designate a mobile station (MS), a mobile terminal (MT), a subscriber station (SS), a portable subscriber station (PSS), user equipment (UE), an access terminal (AT), etc. and may include functions of all or a part of the MT, the SS, the PSS, the UE, etc.

Hereinafter, an apparatus and a method for signing an application according to an exemplary embodiment of the present invention will be described with reference to the accompanying drawings.

FIG. 1 is an exemplary diagram illustrating an environment providing an application signature according to an exemplary embodiment of the present invention.

As shown in FIG. 1, a market server 200 registering and providing various application developed and provided from a developer terminal 300 to users is operatively associated with a signature apparatus 400 and a user terminal 100, respectively. In this case, each time the market server 200 registers a new application or a changed application provided from the developer terminal 300 as a registered application is updated, the signature to apparatus 400 requests a signature with respect to an application together with application information, developer terminal information, and market server information to the market server 200.

Further, the market server 200 having registered a signature-completed application from the signature apparatus 400 provides an application to the user terminal. In this case, the market server 200 provides the signature-completed application including API use authority information of a communication company for executing a corresponding application.

When executing an application purchased and downloaded from the market server 200, the user terminal 100 receives an API use authority for executing an application from the communication company based on application information including execution authority information received from the market server 200, and then executes and provides the application to a user.

Configurations of the signature apparatus 400, the market server 200, and the user terminal 100 in this environment will be described with reference to FIGS. 2 to 4. In an exemplary embodiment of the present invention, it is described that the apparatus 400 for signing an application is implemented separately from the market server 200 by way of example. However, the prevent invention is not always limited thereto.

Figure 2:
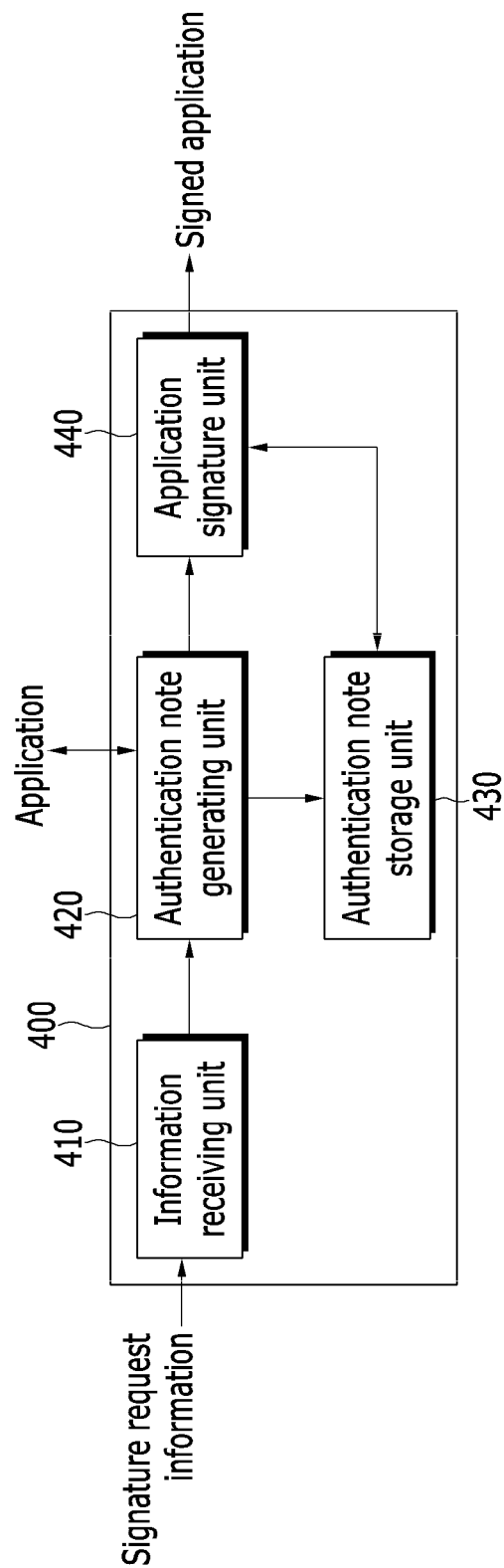
FIG. 2 is a configuration diagram illustrating a signature apparatus according to an exemplary embodiment of the present invention.

FIG. 2 is a configuration diagram illustrating an apparatus for signing an application according to an exemplary embodiment of the present invention.

As shown in FIG. 2, the apparatus 400 for signing application includes an information receiving 420, an authentication node generating unit 420, an authentication note storage unit 430, and an application signature unit 440.

The information receiving unit 410 receives signature request information from the market server 200. Here, the signature request information contains an application code, an application identifier, API use authority level information, and identification information of the market server 200.

The authentication note generating unit 420 searches the authentication note storage unit 430 to determine whether an authentication note for a corresponding application has been previously issued using the application identifier of the signature request information received from the information receiving unit 410. When the authentication note for a corresponding application has been previously issued, the authentication note generating unit 420 transfers the authentication note of the application stored in the authentication note storage unit 430 and the second key to be used for signing the application to the application signature unit 440.

When the authentication note is not issued, the authentication node generating unit 420 generates two keys having a first key and a second key using the application identifier. The first key and the second key are generated corresponding to each other and may refer to a public key and a private key, respectively. There may be various methods to generate the first key and the second key, and thus the detailed description thereof is omitted in an exemplary embodiment of the present invention.

The authentication note generating unit 420 generates an authentication note with the first key generated based on the application information. When generating the authentication node with the first key, the authentication generating unit 420 generates the authentication note by different methods according to API use authority level information. That is, assuming that the API use authority level is set having several levels, the authentication note is set to be generated by different methods according to each level. Moreover, since the authentication note may be generated by different methods according to the market server 200 having requested an application signature, the market server 200 for distributing the application may also be identified using the authentication note.

Further, the authentication note generating unit 420 transfers the authentication note generated with the first key to the authentication note storage unit 430 together with the application identifier included in the signature request information such that the authentication note and the application identifier are stored in the authentication note storage unit 430.

In the authentication note storage unit 430, the application identifier, the authentication note, and the second key are stored corresponding to each other. When determining whether the authentication note has been issued based on an optional application identifier, the authentication generating unit 420 provides information about presence of issuing the authentication note.

The application signature unit 440 generates signature information with respect to an application code with the second key generated by the authentication note generating unit 420. That is, the application code is hashed in a hash function to obtain a hash value, and then the hash value is encrypted to generate the signature information. Here, a method of hashing an application code by a hash function and a method of obtaining a hash value based on the hashing method are already known, and thus the detailed description thereof is omitted in the embodiment of the present invention.

Further, the generated signal information and the authentication node generated by the authentication note generating unit 420 are simultaneously inserted into the application code to sign the application. Then, the signed application code is transferred to the market server 200 to be applied to a corresponding application.

If an authentication note for the application is previously generated, the application signature unit 440 receives the second key from the authentication note storage unit 430 to sign the application code, inserts the generated signature information into the application code together with the authentication note, and transfers the application code to the market server 200.

A market server 200 for providing and managing the application signed by the signature apparatus 400 to the user terminal 100 will be described with reference to FIG. 3.

Figure 3:
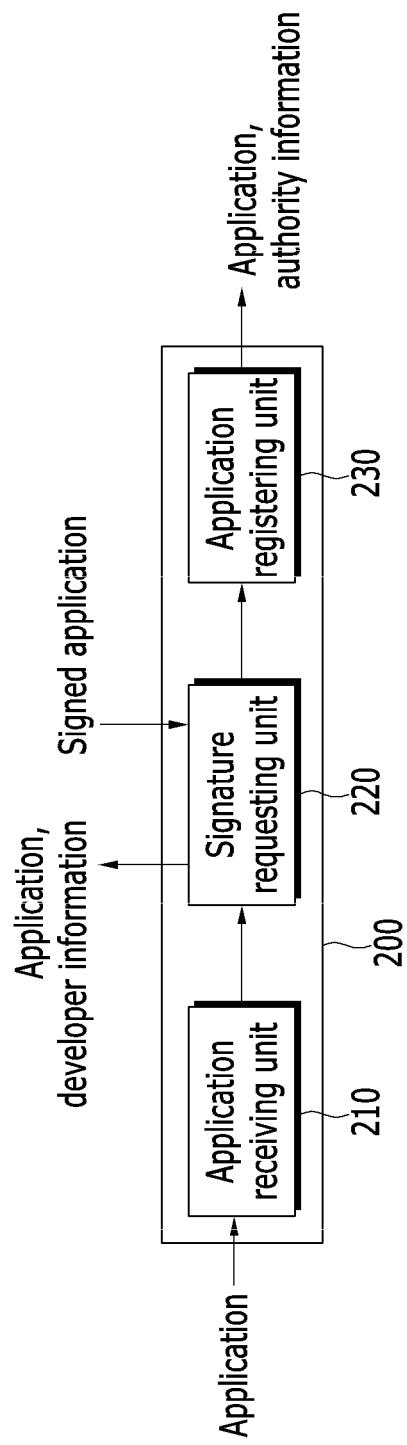
FIG. 3 is a configuration diagram illustrating a market server according to an exemplary embodiment of the present invention.

FIG. 3 is a configuration diagram illustrating a market server according to the exemplary embodiment of the present invention.

As shown in FIG. 3, the market server 200 includes an application receiving 210, a signature requesting unit 220, and an application registering unit 230.

The application receiving unit 210 receives an application and application information from the developer terminal 300. In this case, the application information contains information such as an application code, an application identifier, a developer terminal identification, API use authority level information for executing the application, and a generation day of the application.

The signature requesting unit 220 generates signal request information including identification information of the market server 200 together with the application code, the application identifier, and the API user authority level of the application information received by the application receiving unit 210, and transmits the generated application code, application identifier, API user authority level of the application information, and signature request information to the signature apparatus 400. Moreover, the signature requesting unit 220 receives the application code including signature information provided from the signature apparatus 400 and applies the received application code to a corresponding application.

The application registering unit 230 receives a signed application received by the signature requesting unit 220 and registers the received signed application. Upon receiving a request for provision of an optional application according to a request of the user terminal, the application registering unit 230 provides the application including signature information and an authentication note.

Hereinafter, a configuration of a user terminal 100 for receiving and installing an application in connection with the market server 200 will be described with reference to FIG. 4.

Figure 4:
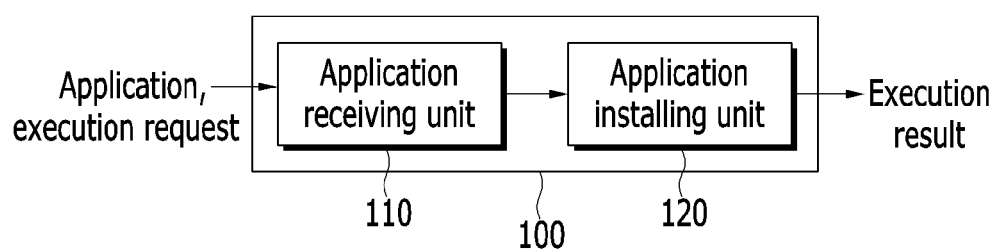
FIG. 4 is a configuration diagram illustrating a user terminal according to an exemplary embodiment of the present invention.

FIG. 4 is a configuration diagram illustrating a user terminal according to an exemplary embodiment of the present invention.

As shown in FIG. 4, the user terminal 100 includes an application receiving unit 110 and an application installing unit 120.

The application receiving unit 110 receives an application including signature information from the market server 200. In this case, the received application is signed from an authentication device 400 and signature information and an authentication are inserted in an application code.

When receiving installation request information from a user with respect to an application received by the application receiving unit 110 from the market server 200, the application installing unit 120 installs the installation request information in the user terminal 100. To install the application, the application installing unit 120 extracts signature information encrypted with the second key and inserted in the application code.

Further, the application installing unit 120 decodes the extracted signal information using an authentication note inserted together with the signature information. If the decoded signature information is identical with a hash value obtained from the application code through a hash function, the application installing unit 120 determines that the application is an executable application which is not modulated.

After determining that the corresponding application is an installable application, the application installing unit 120 checks an API use authority class necessary for execution of an application based on the authentication node inserted in the application code such that the corresponding application may be executed by the user terminal 100. That is why the API use authority class may be checked based on an authentication note because the authentication node is generated differently according to the API user authority class. An application is executed according to the API use authority class checked based on the authentication node and an executed result is provided to a user.

A method of signing an application in an environment of providing the above mentioned application signature will be described with reference to FIG. 5.

Figure 5:
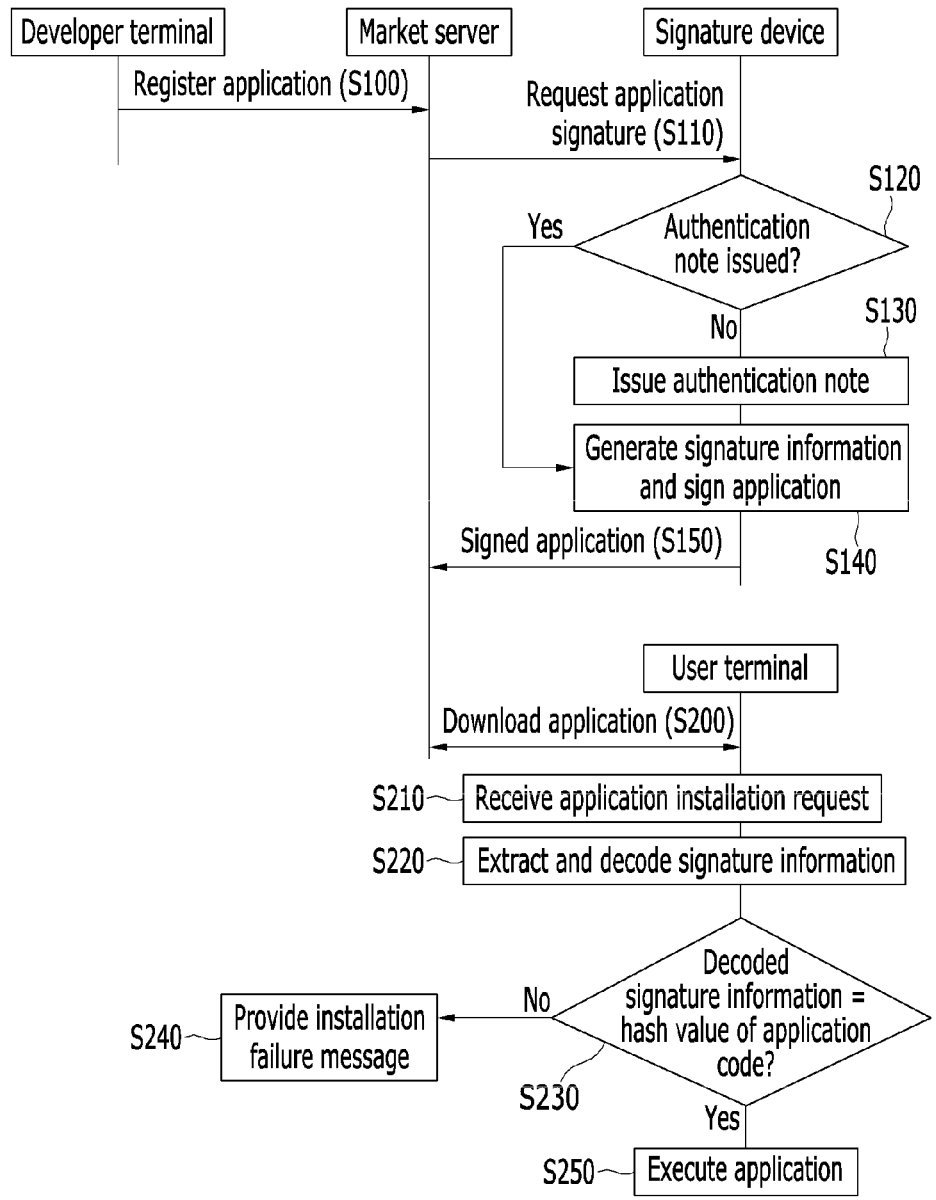
FIG. 5 is a flowchart illustrating a method for signing an application according to an exemplary embodiment of the present invention.

FIG. 5 is a flowchart illustrating an application signature method according to an exemplary embodiment of the present invention.

As shown in FIG. 5, the developer terminal 300 registers an application developed by an application developer in a market server 200 (S100). When registering the application in the market server, application information with API use authority level information for executing a predetermined application and an application are registered by the application developer.

Upon receiving the application from the developer terminal 300 in step S100, a signature requesting unit 220 of the market server 200 transmits signal request information requesting a signature for a corresponding application to the signature device 400 (S110). In this case, the signature request information contains information such as an application code, an application identifier, API use authority level information, and identification information of a market server.

The authentication note generating unit 420 checks whether an authentication note of a corresponding application has been issued and stored in an authentication note storage unit 430 based on the application identifier included in the signature request information received in step S110 (S120).

If an authentication note for a corresponding application has been issued, the application signature unit 440 generates signature information with the second key stored in the authentication note storage unit 430, and inserts the signature information into an application code together with the issued to authentication note. Further, the signed application code is transmitted to the market server 200 such that the market server 200 reflects the signed application code on the application (S140, S150).

As illustrated above, although the authentication note for the application has been issued, the market server 200 requests signature of an application when there is a change in a registered application such as update of the previously generated application by the developer terminal 300.

However, if the authentication note for a corresponding application is not issued, the signature note generating unit 420 generates two keys including the first key and the second key by a previously defined method using application identifier included in the signature request information. Moreover, the signature note generating unit 420 issues the authentication note using the first key based on API use authority level information (S130).

In a method of issuing an authentication note, it is assumed that the authentication note is defined to be issued by different methods according to API use authority level. It is also assumed that the authentication node is defined to be issued by different methods according to a type of a market server 200 requesting signature of the application.

After issuing the authentication in step S130, the application signature unit 440 encrypts the application code included in the signature request information using the second key generated by the authentication note generating unit 420 to generate signature information. In this case, when signing the application, the application code is hashed by a hash function to generate a hash value, and the generated hash value is encrypted with the second key to generate the signature information.

Next, the generated information is inserted into the application code together with the authentication note generated in step S130 to perform a signature indicating that the application received from the market server 200 is an application which is not transformed (S140). The signed application code is transferred to the market server 200 to be applied to the application such that the application to which the signed application code is applied is registered in the application registering unit 230 (S150).

As illustrated above, if a signature procedure in an application is completed, it can be checked from which the application is developed, through which the application is circulated, and in which the application is signed based on authentication note information of the application. That is why a circulation source may be known because information such as identification information of the market server is included in signature request information generated in the market server 200 before signing the application and why information about a developer has been previously registered in the market server 200 when an application generated by the developer terminal 300 is previously registered in the market server 200. Accordingly, thereafter, if there arises a problem in the application, users checking the problem may check from which the application is developed, through which the application is circulated, and in which the application is signed based on authentication note information of the application.

After signing the application in steps S100 to S150, if the user terminal 100 downloads an optional application from various applications in the market server 200, the user terminal 100 performs a signature verifying procedure in an to installation procedure of the application (S200). That is, the application receiving unit 110 of the user terminal 100 receives an application in which the signature information and the authentication note are inserted (S210).

An application installation unit 120 extracts the signature information and the authentication note from the application coded included in the application and then decodes the signature information using the authentication note (S220). Further, the application installing unit 120 determines whether the decoded signature information is identical with the hash value generated by hashing the application code using a hash function (S230).

When the decoded signature information differs from the hash value, because there is a possibility that a corresponding application is a modulated application, the application installing unit 120 provides an installation failure message (S240). However, as a result determined in step S230, when the decoded signature information is identical with the hash value, the application installing unit 120 confirms an authority class of the authentication note and executes an application based on the confirmed authority class to provide a service (S250).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for signing an application by a signature apparatus cooperating with a market server, the method comprising:

receiving, at a signature apparatus, signature request information for an optional application from the market server;

determining whether at least one authentication note from among a plurality of authentication notes has been issued corresponding to application identification information included in the signature request information based on the application identification information;

issuing the at least one authentication note using the application identification information when the at least one authentication note has not been issued;

generating signature information for the application using the application identification information; and at the signature apparatus, signing the application including the at least one authentication note and the signature information and transmitting the signed application code to the market server, wherein the signature request information includes at least one of an application code, an application identifier, application program interface (API) use authority level information requested for executing the application, and identification information of the market server, and wherein issuing the plurality of authentication notes includes generating and issuing different authentication notes which are generated by different methods according to the API use authority level information.

2. The method of claim 1, wherein:
the issuing of the at least one authentication note includes:
generating a first key and a second key using the application identification information;
generating and issuing an authentication note for the application using the first key.

3. The method of claim 1, wherein:
the generating of the signature information includes encrypting a hash value being a result obtained by hashing the application code using a hash function using the second key generated using the application identification information.

4. The method of claim 1, further comprising:
after the determining whether the authentication node has been issued,
signing the application using the issued at least one authentication note and signature information when the at least one authentication note has been issued.

5. The method of claim 1, further comprising:
after the signing of the application,
receiving the application with the at least one authentication note and the signature information from the market server cooperating with the market server;
extracting the at least one authentication note and the signature information by the terminal;
decoding the signature information by the terminal using the at least one authentication note, and comparing the decoded signature information with a hash value being a result generated by hashing the application code through a hash function by the terminal; and
installing the application by the terminal when the decoded signature information is identical with the hash value.

6. An apparatus for signing an application cooperating with a market server and providing the signed application to a terminal cooperating with the market sever, the apparatus comprising:
an authentication generating unit determining whether at least one authentication note from among a plurality of authentication notes is issued based on an application identifier of an optional application received from the market server in response to a request of signature for the optional application, and generating the at least one authentication note with a first key, wherein the first key and a second key is generated using the application identifier;
an authentication note storage unit storing the at least one authentication note, the second key generated using the application identifier, and the application identifier;
an application signature unit encrypting a hash value generated by hashing an application code of the application using a hash function with the second key generated by the authentication note generating unit to generate signature information, inserting the generated authentication note and the signature information into the application code to sign the application, and transmitting the application code to the market server; and
an information receiving unit receiving the signature request information which includes at least one of an application code, an application identifier, application program interface (API) use authority level information requested for executing the application, and identification information of the market server from the market server,
wherein generation of the plurality of authentication notes includes generating and issuing different authentication notes which are generated by different methods according to the API use authority level information.

7. The apparatus of claim 6, wherein:
the terminal includes:
an application receiving unit receiving the application with the application code in which the signature information and the authentication note are inserted; and
an application installing unit extracting the signature information and the authentication note from the application received by the application receiving unit, decoding the signature information using the extracted authentication code, and installing the received application when the decoded signature information is identical with the hash value generated by hashing the application code of the application using the hash function.

* * * * *